Sept. 3, 1968 C. P. CIAFFONE 3,399,775
SEWAGE TREATMENT APPARATUS-GRIT WASHER-EJECTOR
Filed Feb. 1, 1967
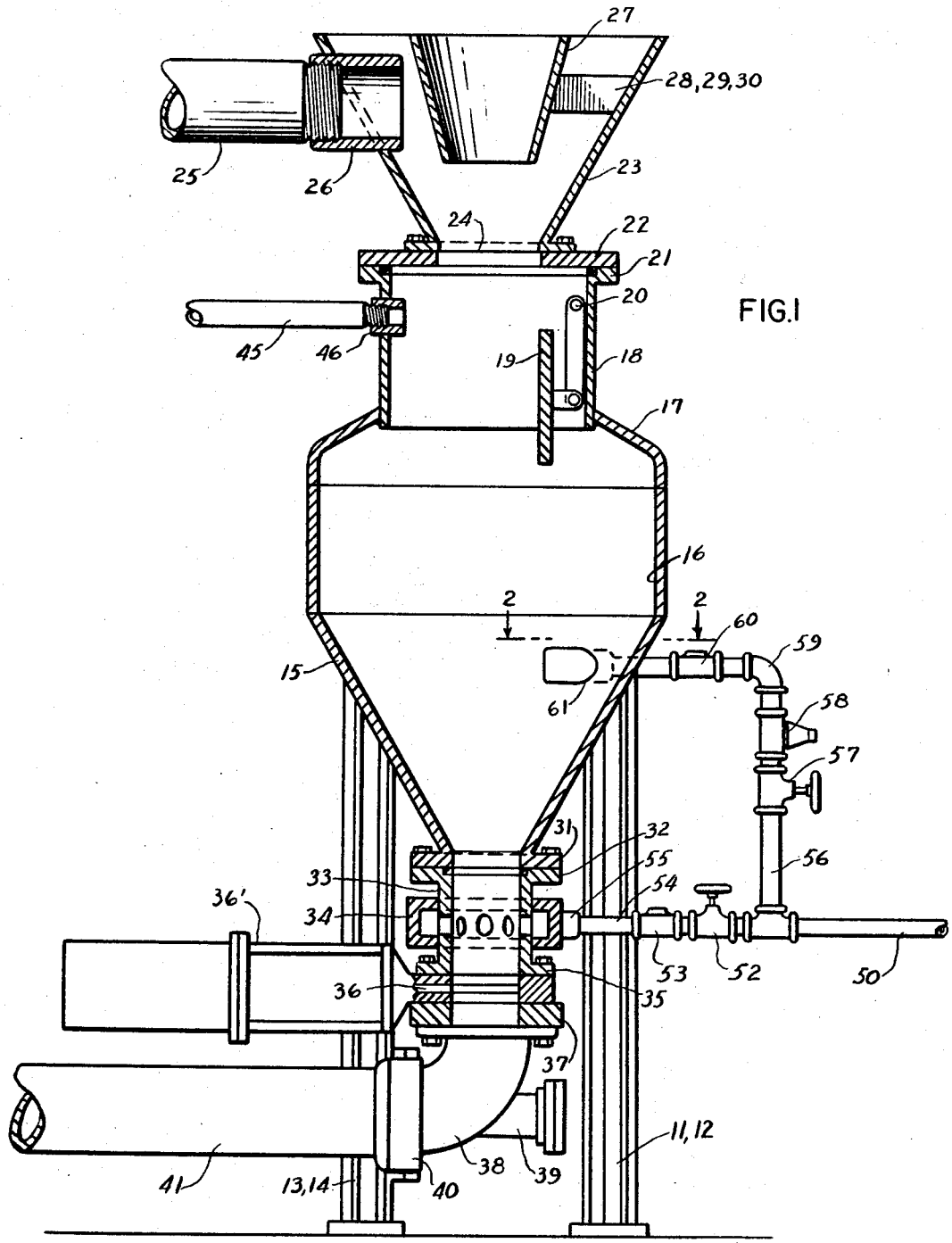
FIG.I
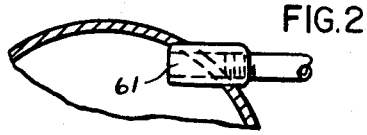
FIG.2
INVENTOR.
CHARLES P. CIAFFONE
BY
ATTORNEY United States Patent Office 3,399,775
Patented Sept. 3, 1968

3,399,775
SEWAGE TREATMENT APPARATUS-GRIT
WASHER-EJECTOR
Charles P. Ciaffone, Sturbridge, Mass., assignor to CPC Engineering Corporation, Sturbridge, Mass., a corporation of Massachusetts
Filed Feb. 1, 1967, Ser. No. 613,292
3 Claims. (Cl. 210—221)

ABSTRACT OF THE DISCLOSURE

The pneumatic ejector is adapted to receive in a generally inverted cone-shaped vessel the water-grit-organic matter mixture characteristic of common sewage flow, wherein the base of the ejector is an inverted cone in which the heavy grit settles permitting the light organic matter to rise to the top, allowing for an overflow so that virtually all of the organic matter is carried off through an overflow pipe, the ejector container itself being equipped with a flap valve suitable for closing off the inlet to make the vessel air tight, the bottom being equipped with a gate valve, again suitable for making the vessel air tight, whereby compressed air can be admitted to the ejector to build up a pressure therein and with the opening of the gate valve, the grit ejected strongly through a bottom discharge pipe and delivered to a deposit site. Provision is made for continuous backwash of the grit which settles in the ejector with a view to removing virtually all organic matter and washing the grit substantially free of odoriferous organic material.

---

This invention is concerned with an apparatus for the separation of inorganic grit or solid matter from organic matter, for example, particularly in sewage, with a view to accumulating the grit in a confined space and, thereafter, moving it pneumatically, after washing, to a point of deposit.

Detailed description of the invention

The construction of the invention and the relationship of the several component parts can be best understood by reference to the drawings accompanying this specification, wherein FIGURE 1 is a longitudinal section through the apparatus, which, because it is essentially symmetrical about a longitudinal axis, shows the construction;

FIGURE 2 is a partial transverse section showing an orientation of orifices for a backwash fixture in the apparatus.

Referring now to FIGURE 1, the apparatus stands on the ground 10, supported by vertical legs 11, 12, 13 and 14, four being a usual quota for a device this size. The legs are generally integrally joined to the tank 15 which consists of conical section 15, topped by cylindrical section 16, having a cover section 17, which narrows down to an inlet neck 18, carrying an internal flap valve 19, pivoted at 20. A slide valve will do. The latter valve may be pneumatically or hydraulically operated by any suitable external arrangement. The top terminates in a flange 21, carrying a cover plate 22, on which is fastened a conical inlet 23, suitable for guiding material into the central opening 24.

An overflow pipe 25 is fastened to overflow connection 26.

Within the conical inlet section, there is supported a grit inlet funnel 27 which is supported by integrally joined ribs or symmetrically placed braces 28, 29, 30.

The bottom of the conical section of the tank terminates in a flange 31 meeting orifice ring flange 32 which joins a short pipe section 33, around which is built the orifice ring 34, which consists of exterior channel 34 surrounding the pipe 33 and having radially spaced orifices on its circumference communicating from the pipe 33 through the wall into the orifice ring on chamber 34 itself. This section of the apparatus terminates in a flange 35, joining a gate valve 36, terminating in the flange 37, which connects to an elbow 38 equipped with a clean out plug 39, joining by means of a flange 40 with a discharge pipe 41. The latter discharge pipe 41 may be of any suitable length and, in some installations, it may be flexible so that the actual discharge of the wet grit can be moved from point to point where it is desired to deposit fill.

The gate valve external housing is at 36' and virtually any external hardware suitable for opening and closing the gate valve may be used. That is, the particular type of valve we have found useful is a gate valve because upon opening a clear, straight channel is made available. The exact mechanism for opening or closing is a matter of designer's choice. Pneumatic or electrical mechanism for operating the valve gate is an option consistent with the nature of the equipment.

The backwash water system consists of supply pipe 50 which branches, the mainline going through valve 52, through check valve 53, and nipple 54, to connect to the orifice ring at coupling 55. The branch consists of nipple 56, joining valve 57, connecting with aspirator 58 in the next section which joins elbow 59, check valve 60 and then the backwash orifice 61. As noted in the plan view of FIGURE 2, the section showing the backwash arrangement, the orifice 61 is arranged to cause water to discharge tangentially around the inside of the tank.

Pressure air line 45 connects to inlet 46 to supply compressed air for ejecting washed grit.

Operation of the device is virtually self evident.

The sludge containing the grit and certain residual organic matter is admitted through grit inlet funnel 27. From this point, reliance is placed on gravity or, rather, the difference in specific gravity between the inorganic grit and the organic matter and a gentle backwash to develop separation of the inorganic grit from the organic matter.

The sludge flows in through the inlet funnel 27, with the gate valve 36 closed, and flap valve 19 open. Sludge accumulates in the vessel and the grit settles through the conical portion of the vessel through a slowly rising backwash of water admitted through orifice 61 and orifice ring 34 down into the section housing the gate valve while the organic matter is floated off through the inlet opening and out through the overflow pipe 25, 16. When a significant volume of grit has been separated from the organic matter, the flap valve 19 is closed, the gate valve 35 is opened, and air under pressure of 50–100 pounds per square inch is forced in through the pressure air inlet 45. When the pressure within the vessel builds up, the gate valve is opened quickly and the mass consisting of the washed grit is blown out through the discharge pipe 41 to be deposited at whatever point of discharge is selected. Generally, with a well washed grit the material at this point is entirely inoffensive inorganic matter and can be used as fundamentally clean fill in land areas where this is desirable. Otherwise, the discharge can be blown into trucks to be carried to points where land fill is desired. It is unnecessary as in prior practice to bury the grit.

The backwashing is an important part of the operation and while the apparatus can function without the backwash, it is most desirable to provide for the backwash of the grit, and actually to backwash the grit carefully. Clean fill is thus separated from the sludge. This operation is carried out as follows: During accumulation of grit in the vessel, the introduction of new material or rather new sludge for separation of the organic matter is discontinued and, relying again upon the fact that any occluded organic matter with the grit will have a lower specific gravity than the grit itself, water is introduced via valve 52 and through check valve 53, which stops a backflow. Similarly, a top wash with or without aerated water, coming in via 50, as part of the backwash operation can be employed by opening valve 57. These two wash lines are isolated from the accumulation tank by the check valves because it is important in the ejection to pressurize the tank and that no flow of grit in this direction occur. The water, usually plant effluent, is introduced by way of the bottom orifices in the orifice ring 34, whereupon the water passes up through the accumulated grit in the conical section, thereby separating it from occluded organic matter, floating the latter to the top and up out through the overflow pipe. The churning of the grit causes occluded grit-organic particles to be abraded, separated and the organic to float up. When the washing operation is complete, its effectiveness is shown by the fact the grit is quite clean and inoffensive. The vessel, being full of water and grit, is then emptied by closing flap valve 19 and opening the gate valve 35 after applying pressure through the pressure air inlet. Based upon the pressure of the air applied, the accumulated water and grit in the tank is ejected at a substantial velocity and can be delivered any distance. (Distances of 100 to 2000 feet away are common at points where fill is to be deposited, with little difficulty.)

It is important to observe that the material entering the backwasher is a sludge of organic and inorganic matter which has been separated from the total sewage flow. Fundamentally, it can be called primary separated material. When introduced into the separator through funnel 27, the mixture of organic and inorganic matter is such that unless the system is kept in a mild state of agitation an inadequate separation of organic and inorganic matter will be effected. Hence, with the backwash provided through orifice chamber 34, as the sludge settles, water is introduced through valves 43, 54 and 55 at a rate of a few gallons per minute to create a slight upward current which, it will be observed, diminishes in velocity with the taper of the conical bottom 15, so that the organic matter is carried to the top. To the extent that a bit of additional agitation is required, it is induced by the introduction of wash water through orifice 61 which may include aspirated air to help accelerate the separation of organic and inorganic matter. The water rises through the body of the cylinder 16 to the neck 17 and ultimately the overflow water and organic matter passes out through connection 26 and pipe 25. The controlled turbulence thus developed in the pot serves to scour the inorganic grit particles free of organic matter, thus producing a clean grit which settles into the bottom of the equipment. The degree of turbulence is controllable by regulating the rate of flow of water into and through the apparatus. It is to be observed further that the flow of water occurring from a beginning point at the narrowest part of the channel and extending upward through the widening cone and being completed with the tangential jet 60 is effective.

Effluent water from the settling tanks and the aeration tanks at the sewage treatment plant can be used as a wash water introduced through line 50. This is a plumbing expedient and it should be apparent that in the treatment of sewage it is not necessary to employ potable water but rather the effluent from the plant be used in this backwash operation.

Thus, working with the material from the primary settling which is introduced through the funnel 27, which can be gravity settlings or material recovered by a centrifugal separator or classifier, it is possible to effect a quite clean separation of the organics from the inorganics in the sewage flow, thereby to improve the performance and efficiency of the process.

Actual experience in the handling of the particular sludge at any particular plant will indicate precise process variables such as volume of sludge fed into the tank to be matched against the rate of backwash and the rate of tangential flow. The nature of the sludge and grit will vary from place to place and conditions in the community. Thus, at various points of the sewage collection system much fine grit carries over into the sewage and it is for this reason that no general description of rates of flow can be given to be used in developing the backwash in an apparatus of this kind.

The sizes and dimensions of the pipes are proportional to the design load and may vary depending upon the installation. The actual ejector I have found as a useful vessel for installation in sewage treatment plants need not exceed 4 feet in diameter at its circular cylindrical section and the height from the gate valve to the top need not exceed six feet. The discharge pipe can be six inch pipe and the overflow pipe likewise need be no more than a size pipe suitable for carrying the volume of water involved. The actual dimensions are direct matters of hydraulic design.

What is claimed is:

1. In an apparatus for separating inorganic grit from suspended organic matter in sewage wherein the materials are separated by gravity and floatation, the improvement comprising a cylindrical vessel terminating in a conical section, said vessel having a top inlet and a bottom large diameter conduit as a collector and outlet for said conical section, said bottom conduit being equipped with a circumferential ring of inwardly directed orifices, connection means for introducing wash water to said ring, a closure valve for closing the top of said vessel and a closure valve for closing the bottom conduit, thereby to make the vessel air tight, and conduit means adjacent said top inlet for introducing air under pressure into said vessel, so that upon opening the bottom closure valve, the contents of the vessel are ejected forcibly under pneumatic pressure.

2. Apparatus in accordance with claim 1 wherein a wash water conduit connection in said vessel is provided so that agitated material is subjected to tangential circulatory force of the wash water introduced, thereby to induce effective washing thereof.

3. Apparatus in accordance with claim 2 wherein the last mentioned wash water conduit is provided with an air inlet to permit aeration of wash water introduced and to provide turbulence in washing.

References Cited

UNITED STATES PATENTS

| | | | |
|---|---|---|---|
| 631,571 | 8/1899 | Hayden | 210—512 |
| 2,570,132 | 10/1951 | Koupal | 210—410 |
| 2,696,462 | 12/1954 | Bodkin | 210—112 X |
| 2,874,118 | 2/1959 | Albertsen | 210—512 X |
| 3,225,933 | 12/1965 | Berline | 210—333 |
| 3,280,978 | 10/1966 | Scott | 210—333 X |
| 3,285,420 | 11/1966 | Muller | 210—333 X |
| 3,298,519 | 1/1967 | Hollingsworth | 209—170 X |

FOREIGN PATENTS 21,668    1909    Great Britain.

REUBEN FRIEDMAN, *Primary Examiner.*

J. De CESARE, *Assistant Examiner.*